United States Patent
Tombaz et al.

(10) Patent No.: US 10,582,474 B2
(45) Date of Patent: Mar. 3, 2020

(54) PAGING AND TRACKING A WIRELESS COMMUNICATION DEVICE

(71) Applicant: Telefonaktiebolaget LM Ericsson (publ), Stockholm (SE)

(72) Inventors: Sibel Tombaz, Stockholm (SE); Pål Frenger, Linköping (SE); Magnus Olsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/087,329

(22) PCT Filed: Mar. 24, 2016

(86) PCT No.: PCT/EP2016/056625
§ 371 (c)(1),
(2) Date: Sep. 21, 2018

(87) PCT Pub. No.: WO2017/162300
PCT Pub. Date: Sep. 28, 2017

(65) Prior Publication Data
US 2019/0268877 A1    Aug. 29, 2019

(51) Int. Cl.
*H04W 68/04* (2009.01)
*H04W 76/28* (2018.01)
(Continued)

(52) U.S. Cl.
CPC ........ *H04W 68/04* (2013.01); *H04W 60/04* (2013.01); *H04W 64/006* (2013.01); *H04W 68/02* (2013.01); *H04W 76/28* (2018.02)

(58) Field of Classification Search
CPC ............... G07C 5/008; G07C 2205/02; G07C 9/00309; G07C 2009/00769;
(Continued)

(56) References Cited

U.S. PATENT DOCUMENTS

| | | | |
|---|---|---|---|
| 2008/0119209 A1* | 5/2008 | Upp | H04W 68/02 455/458 |
| 2010/0081455 A1* | 4/2010 | Teasdale | H04W 60/04 455/456.1 |

(Continued)

FOREIGN PATENT DOCUMENTS

| | | |
|---|---|---|
| EP | 2320694 A1 | 5/2011 |
| WO | 2008082193 A1 | 7/2008 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.0.0, Jun. 1, 2012, pp. 1-302, 3GPP, France.

(Continued)

*Primary Examiner* — Nimesh Patel
(74) *Attorney, Agent, or Firm* — Sage Patent Group (57) ABSTRACT

It is provided a wireless communication device adapted to employing a paging and/or tracking mode determined based on a motion state of the wireless communication device, a network entity adapted to determining a paging and/or tracking mode for the wireless communication device, and a method for paging and/or tracking a wireless communication device the wireless communication device being adapted to communicate with the network entity of a wireless communication network, and further adapted to evaluate, in the wireless communication device, a condition that indicates an in-motion or stationary state of the wireless communication device and transmit information for adapting a paging and/or tracking mode in the network, information indicating the in-motion or stationary state of the of the (Continued)

wireless communication device towards the communication network.

15 Claims, 6 Drawing Sheets

(51) Int. Cl.
*H04W 60/04* (2009.01)
*H04W 64/00* (2009.01)
*H04W 68/02* (2009.01)

(58) Field of Classification Search
CPC ........ G07C 2009/00865; G07C 5/0808; G07C 5/0816; G07C 9/00571; G07C 5/085; H01Q 1/3275; H01Q 21/30; H01Q 21/28; H01Q 1/241; H01Q 5/385; H01Q 5/392; H01Q 9/0435; H01Q 9/0457; H01Q 5/00; H01Q 1/243; H01Q 5/364; H01Q 5/371; H01Q 25/00; H01Q 25/04; H04L 67/12; H04L 2209/84; H04L 5/08; H04L 1/00; H04L 1/0075; H04L 1/06; H04L 67/2823; H04L 69/08; H04L 9/0866; H04L 12/1836; H04L 63/102; H04L 67/28; H04L 67/322; H04L 41/0889; H04L 41/5003; H04L 51/38; H04L 65/80; H04L 67/16; H04W 4/02; H04W 4/021; H04W 4/046; H04W 4/90; H04W 4/04; H04W 64/00; H04W 88/06; H04W 76/50; H04W 84/005; H04W 84/22; H04W 36/14; H04W 36/30; H04W 36/32; H04W 48/04; H04W 4/38; H04W 4/40; H04W 4/44; H04W 88/10; H04W 28/0268; H04W 40/24; H04W 8/22; H04W 4/80; H04W 76/10; H04W 84/12; H04W 48/16; H04W 48/18; H04W 4/00; H04B 7/0413; H04B 7/0802; H04B 15/00; H04B 15/06; H04B 1/005; H04B 1/006; H04B 1/3822; H04B 1/406; H04B 3/02; H04B 7/14; H04B 1/086; H04B 7/0825; H04B 7/0404; H04B 7/0617; H04B 7/18563; H04M 1/72569; H04M 1/6091; H04M 2250/12; H04M 1/72522; H04M 11/04; H04M 1/6083; H04M 3/5116; H04M 7/006; Y02T 90/16; Y02T 10/7044; Y02T 10/705; Y02T 10/7055; Y02T 10/7077; Y02T 90/163; Y02T 90/168; Y02T 90/169; G06F 13/102; G06F 13/4022; G06F 13/4282; G06F 16/29; B60R 2300/105; B60R 11/0241; B60R 11/0247; B60R 2001/1215; B60R 2001/1223; B60R 2001/1284; B60R 2011/0294; B60R 21/01566; B60R 2300/302; B60R 2300/406; B60K 2370/52; B60K 2370/55; B60K 2370/589; B60K 2370/592; B60W 10/06; B60W 10/08; B60W 20/13; B60W 20/40; B60W 2510/244; B60W 40/00
See application file for complete search history.

(56) References Cited

U.S. PATENT DOCUMENTS

| | | | | |
|---|---|---|---|---|
| 2010/0164790 A1* | 7/2010 | Wisnewski | .......... | H01Q 1/3208 455/67.11 |
| 2010/0255841 A1* | 10/2010 | Kubo | .................... | H04W 60/00 455/435.1 |
| 2013/0059582 A1* | 3/2013 | Del Signore | ......... | H04W 60/04 455/435.1 |
| 2014/0022974 A1* | 1/2014 | Eriksson | ........... | H04W 56/0005 370/311 |
| 2015/0016412 A1* | 1/2015 | Horn | ..................... | H04W 36/24 370/331 |
| 2015/0038180 A1* | 2/2015 | Quick, Jr. | ............. | H04W 64/00 455/458 |
| 2015/0271782 A1* | 9/2015 | Ljung | ................... | H04W 68/02 455/456.1 |
| 2018/0300816 A1* | 10/2018 | Perl | ........................ | G06Q 50/01 |

OTHER PUBLICATIONS

Mitsubishi Electric, "Velocity-optimised tracking areas", 3GPP TSG RAN WG3 Meeting #51bis, Sophia-Antipolis, France, Apr. 3, 2006, pp. 1-4, R3-060492, 3GPP.

* cited by examiner

PAGING AND TRACKING A WIRELESS COMMUNICATION DEVICE

TECHNICAL FIELD

The present invention relates to a wireless communication device adapted to employing a paging and/or tracking mode determined based on a motion state of the wireless communication device, to a network entity adapted to determining a paging and/or tracking mode for the wireless communication device based on the motion state of the wireless communication device, and a method for paging and/or tracking a wireless communication device.

BACKGROUND

Paging and tracking are important procedures to operate a network. That is, in order to provide services to the wireless communication device, the network needs to know the location of a wireless communication device such as a mobile terminal, user equipment or the like.

During the tracking and paging procedures the wireless communication devices periodically activate in order to determine a tracking area and to receive a paging message. Paging is for instance used for network initiated connection set up. For instance, when the wireless communication device is in an idle state, e.g. Radio Resource Control RRC-idle state for Long Term Evolution LTE, the wireless communication device camps and monitors for instance the L1/L2 control signaling for paging messages.

Typically paging is carried out on a paging cycle wherein the wireless communication device is not monitoring any channels for paging messages and only wakes up for a limited amount of time in the paging cycle in order to accept paging messages.

The so-called on-duration where the wireless communication device is awaiting a paging message, defines the amount of resources used for paging on the side of the wireless communication device. The overall paging cycle, i.e. the repetition frequency of the on-duration, is for instance for LTE set to a maximum of 2.5 seconds. It is the aim for future applications or future networks to increase the paging cycles for instance up to 24 hours for specific applications. This would lead to lowering the use of resources, i.e. lowering energy consumption of the wireless communication device.

On the network side, the service area is divided in tracking areas for locating a wireless communication device. In order to provide respective services to the wireless communication device the network tracks the wireless communication device using the paging procedure. Typically a tracking area configuration for the wireless communication device is controlled by a network entity such as a mobility management entity, MME. That is, since the location of the wireless communication device is typically not known to the network, the paging procedure uses the paging message transmitted across several cells in one or more tracking areas. When the wireless communication device periodically wakes up according to the paging procedure and determines which tracking area it is currently located in, the wireless communication device subsequently notifies the network and/or the network entity about its current location. For instance in case the tracking area is not in a predefined allowed tracking area list, the wireless communication device initiates a location area update procedure in order to inform the network of its current location.

The wireless communication device can be configured with a list of tracking areas it can move in-between, while in idle mode. This subsequently reduces the number of location area updates the wireless communication device has to perform.

Typically the paging procedure includes performing paging in a smaller area, e.g. one cell up to several cells, and subsequently, if the wireless communication device is not found in the small area, the network performs paging the wireless communication device in a larger area, e.g. all cells in the tracking area list.

SUMMARY

That is the more paging messages the network has to send in order to locate the wireless communication device, the more resources are used on the network side.

Therefore there is the need to reduce the resources used for paging and tracking a mobile communication device connected to a network, in particular for the mobile communication device as well as the network.

The above-mentioned problems and drawbacks of the conventional methods are solved by the subject matter of the independent claims. Further preferred embodiments are described in the dependent claims.

According to an aspect of the present invention there is provided a wireless communication device adapted to communicate with a network entity of a wireless communication network, and further adapted to evaluate, in the wireless communication device, a condition that indicates an in-motion or stationary state of the wireless communication device; and to transmit information for adapting a paging and/or tracking mode in the network, the information indicating the in-motion or stationary state of the wireless communication device towards the communication network.

According to another aspect of the present invention, there is provided a network entity coupled to a wireless communication network adapted to receive data from a wireless communication device, the network entity comprising processing resources being configured to receive, from a wireless communication device, information for adapting a paging and/or tracking mode in the network indicating an in-motion or stationary state of said wireless communication device; determining a paging and/or tracking mode for the wireless communication device based on the information indicating the in-motion or stationary state of the wireless communication device.

According to another aspect of the present invention, there is provided a network system comprising a wireless communication device according to an embodiment of the present invention and a network entity according to an embodiment of the present invention.

According to another aspect of the present invention there is provided a method for paging and/or tracking a wireless communication device of a wireless communication network comprising the steps of evaluating, in the wireless communication device, a condition that indicates an in-motion or stationary state of the wireless communication device; transmitting information for adapting a paging and/or tracking mode from the wireless communication device towards the communication network, the information indicating the in-motion or stationary state of the wireless communication device; receiving from the wireless communication device the information indicating an in-motion or stationary state; determining a paging and/or tracking mode for the wireless communication device based on the received information; and transmitting instructions towards the wireless communication device to use said determined paging and/or tracking mode.

According to another aspect of the present invention a computer program is provided that comprises code, the code, when executed on processing resources, instructs the processing resources to perform a method embodiment of the present invention.

According to yet another aspect of the present invention a computer program product is provided that stores a code the, the code when executed on processing resources, instructs the processing resources to perform a method of the embodiment of the present invention.

BRIEF DESCRIPTION OF THE DRAWINGS

Embodiments of the present invention which are presented for a better understanding of the inventive concepts but which are not to be seen as limiting the invention will now be described with reference to the figures in which.

DETAILED DESCRIPTION

Figure 1:
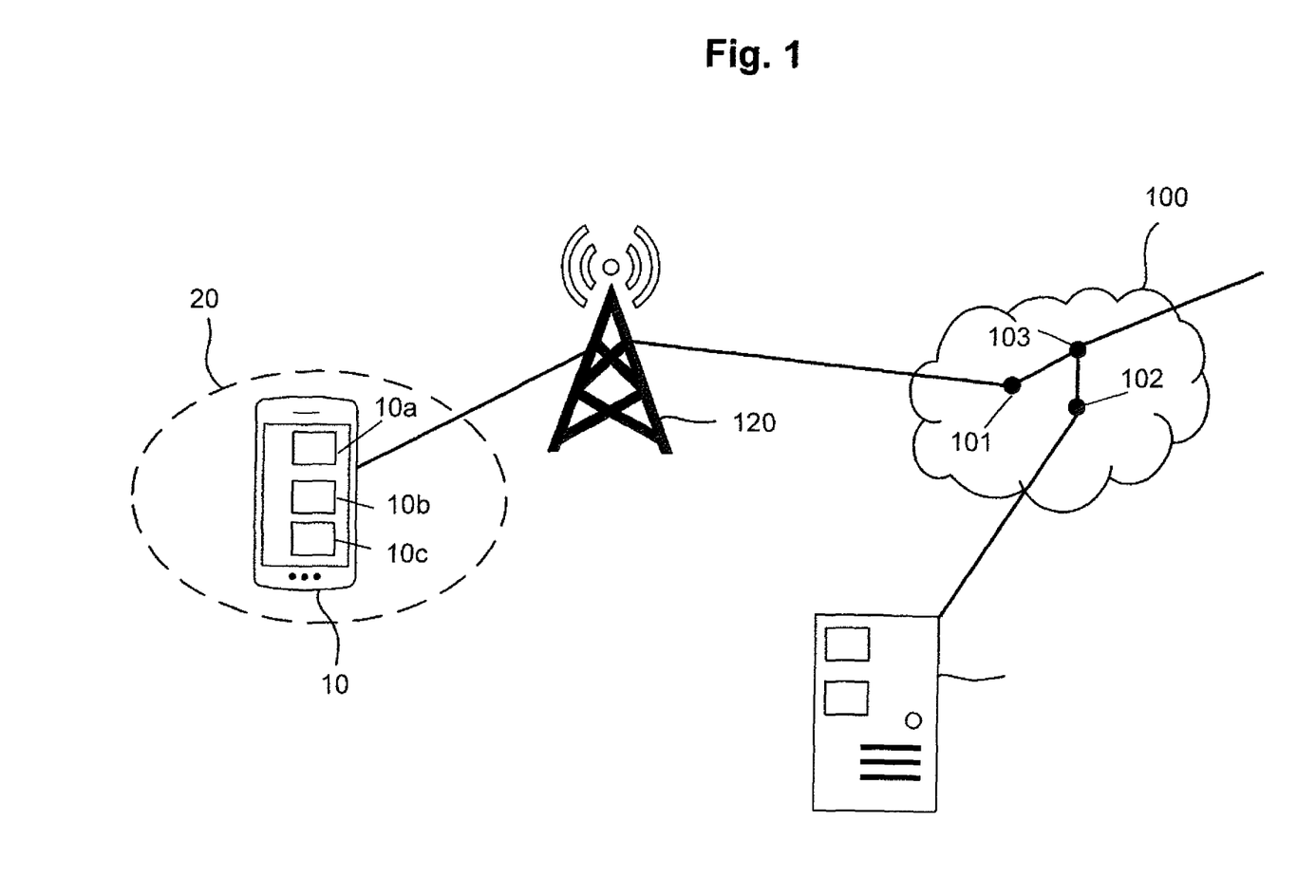
FIG. 1 shows a schematic overview of an exemplary network environment in which a wireless communication device is paged and tracked according to an embodiment of the invention.

FIG. 1 shows a schematic overview of an exemplary network environment in which paging and/or tracking of a wireless communication device is performed according to one embodiment of the invention. A network 100, for instance a mobile or wireless communication network, includes a number of network elements 101-103 such as network nodes, routers, gateways, switches, switching centers, base stations, wireless or wire bound links, and the like. In general, the purpose of the network 100 will be to provide a network 100 service to a plurality of wireless communication devices 10 such as mobile terminals, user equipment, and the like. Such services include telephone, video telephone, chatting, Internet browsing, email access and the like. For this purpose the network elements 101-103 will convey data via base stations 120 to and from the plurality of wireless communication devices 10. The base stations 120 may be connected to the individual wireless communication devices 10 via usual radio links for transmitting and receiving data to and from a wireless communication device 10. The network 100 may further have a connection to some sort of network entity 110, such as a server or a resource in a data center.

In order to perform paging and/or tracking of a wireless communication device the network needs to know where the wireless communication device 10 is located. The present embodiment provides a network environment that is configured such that paging and tracking of the wireless communication device 10 may be carried out with the use of fewer resources than in a conventional method, as explained in greater detail below.

Generally, in one embodiment of the present invention the wireless communication device 10 may be connected to different network elements 101-103 and base stations 120 in the usual manner. During tracking and paging procedures a wireless communication device 10 is periodically active in order to determine a tracking area 20 it is currently positioned in and to receive a paging message. A paging cycle includes a period without transmission of control signals for paging and tracking the wireless communication device such as a discontinuous transmission period, DTX.

In other words paging is a procedure that may be used for network initiated connection setup e.g. when the UE is in an RRC IDLE state in case of LTE. In LTE, the UE camps on a selected cell and monitors the L1/L2 control signaling for paging messages.

In other words a paging cycle may be defined, allowing the wireless communication device to sleep most of the time and only briefly wake up to monitor for instance the L1/L2 control signaling. The maximum and maybe most power efficient paging cycle in LTE may be 2.56 seconds. Future networks may support even longer paging cycles e.g. 24 hours for machine type communication, M-MTC, applications.

In one embodiment of the present invention the on-duration may be divided into several parts, e.g. an on-duration for tracking area determination and an on-duration for paging reception.

The wireless communication device 10 may be located in a tracking area 20 and connected to a base station 120 of the network 100 which is eventually connected to a network entity 110. During the on-duration of a paging cycle the wireless communication device 10 may receive a paging message via the base station 120 transmitted from the network entity 110 through the network 100. If no paging message is received while the wireless communication device 10 stays within that tracking area 20, the wireless communication device 10 goes back to sleep in order to wake up again in the next paging cycle.

In other words in one embodiment of the invention, the wireless communication device may seldom be configured with the maximum possible paging cycle since the cost for paging the wireless communication device becomes high. This may be inefficient since the energy consumption by the wireless communication device is inversely proportional to the paging cycle.

If the wireless communication device 10 is not in the tracking area 20, it carries out a procedure to connect to the network 100 and inform the network 100 about its current location.

That is, while the wireless communication device 10 is in an active state, i.e. communicating or connected to the base station 120 (e.g. RRC-connected state), its location is known to the network 100 at a cell level, i.e. on a cell grid. However, while the wireless communication device 10 is in idle state, that is not communicating (e.g. RRC-idle state), its location is known to the network 100 on a tracking area level, i.e. down to a tracking area 20, instead of a cell level. In one embodiment an operator may define a group of neighbouring base stations as a tracking area 20. Said grouping may be typically performed at an initial deployment of the network 100 wherein each base station 120 is configured with its own tracking area 20. In one embodiment a tracking area 20 can be made up of cells or base stations 120.

If there is data traffic heading from the network to the wireless communication device, for instance a text message to the wireless communication device, the network has to wake up the wireless communication device in order to receive data. This "wake up", i.e. paging, is performed in a respective tracking area 20. The network 100 considers the wireless communication device 10 to be located in a specific tracking area 20. When the network 100 has to page the wireless communication device 10, it sends a paging message to every base station 120 associated with the tracking area 20. Subsequently each base station 120 broadcasts the paging message over a radio link in order to page, i.e. wake up, the wireless communication device 10. The wireless communication device 10 in idle state wakes up at the on-duration of a paging cycle in order to check for a paging message to see if there is any incoming data. In case the wireless communication device 10 finds a paging message from the base station 120, it turns back to active state in order to receive data.

In other words the tracking area configuration in the wireless communication device may be controlled by the MME. Since the wireless communication device location may typically not known, the paging message may be transmitted across several cells in one or more tracking areas. The wireless communication device periodically may wake up and determines which tracking area that it is currently located in and in case the tracking area is not in the allowed tracking area list the wireless communication device may initiate a location area update procedure in order to inform the network of its current location.

In other words a wireless communication device can be configured with a list of tracking areas that it can move between in idle mode. This may reduce the number of location area updates the wireless communication device 10 has to perform.

In one embodiment paging may be done first in a smaller area, e.g. one of a few cells, and if the UE is not found there the network may page the wireless communication device 10 in a larger area, e.g. all cells in the tracking area list.

Figure 5:
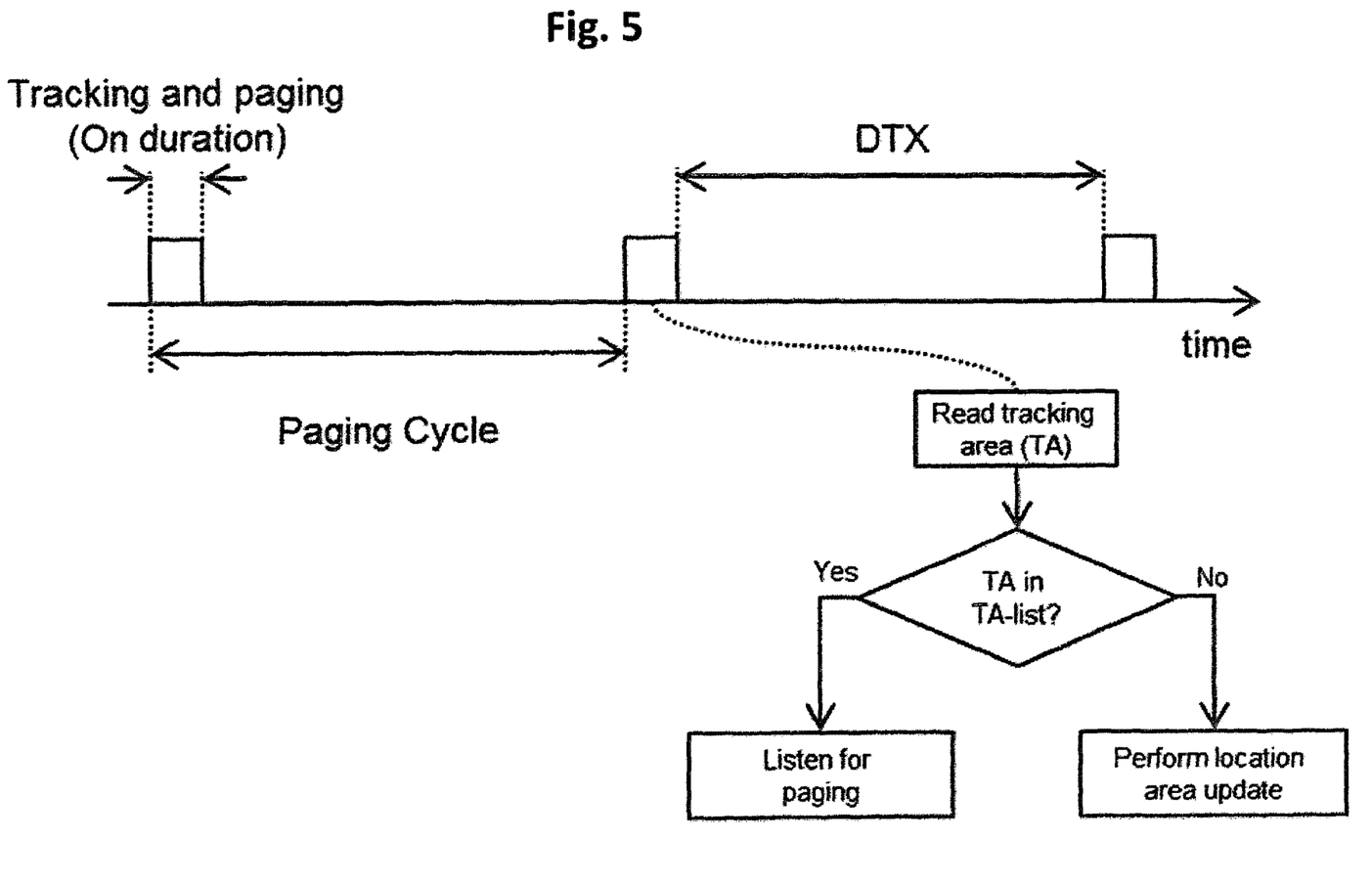
FIG. 5 shows an exemplary paging configuration according to one embodiment of the present invention.

In other words during the tracking and paging operation the wireless communication device may periodically activate in order to determine the tracking area and to receive paging messages. In FIG. 5 this is exemplified with a paging cycle and an on-duration interval. In some implementations the on-duration interval may be divided into different parts e.g. one on-duration for tracking area determination and another on-duration for paging reception.

The network 100 may have to have updated location information about the wireless communication devices 10 in idle state in order to find out which tracking area 20 a particular wireless communication device 10 is located in. The wireless communication device 10 may notify the network 100 or the network entity 110 of its current location by sending a message such as a tracking area update message every time it moves between tracking areas.

That is, a wireless communication device 10 may obtain a tracking area list when it connects to a network 100. This list shows tracking areas 20 the network 100 assumes the wireless communication device 10 is located in and within which a wireless communication device 10 can travel without the need for a tracking area update message.

That is, the wireless communication device 10 may not have to send a message to the network or the network entity 110 as long as it stays in a tracking area included in the tracking area list. However, wireless communication device 10 may have to send a message to the network 100 or the network entity 110 when it moves to a new tracking area not included in the list. Subsequently the network entity 110 provides the wireless communication device 10 with a new tracking area list reflecting the latest move of the wireless communication device 10 to a new tracking area 20.

In order to enable low energy consumption at the wireless communication device 10 it is desirable to keep the on-duration relatively short and the waiting period comparatively long. This may for instance enable the wireless communication device to stay as long as possible in a low energy consuming sleep state.

That is, during the on-duration the wireless communication device may read the tracking area and may determine if it is in the allowed tracking area list. If it is the wireless communication device may listen for a paging message. If no paging message is received the wireless communication device may go back to sleep again. If the determined tracking area is not in the allowed tracking area list the UE performs a location area update i.e. it performs a random access connection to the network and informs the network about its new location before going back to sleep again.

In other words in one embodiment of the invention to enable low energy consumption the "on-duration" may be as short as possible and the "DTX" may be as large as possible. This may enable the wireless communication device to stay as much as possible in a low energy consuming sleep state.

In order to enable efficient network paging the waiting period, i.e. the discontinuous transmission (DTX), should be short in order for the wireless communication device 10 to be paged quickly whenever needed. Further, the on-duration should be long in order to enable the network to page the wireless communication device 10 multiple times. This may for instance enable initially paging the wireless communication device only in the cell where it was active in the past, and may suppress the need to send out a paging message over the tracking areas in the entire tracking area list.

In order to use less resource during paging and tracking of a wireless communication device both the requirements on the wireless communication device side and the network side may need to be met. That is, for instance the wireless communication device may reduce its energy consumption and at the same time a more efficient network paging may be employed.

Figure 6:
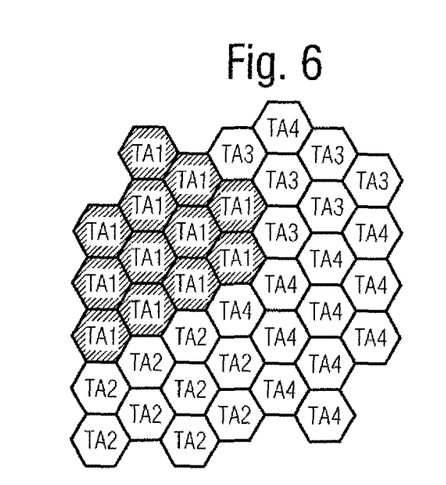
FIG. 6 shows a configuration of cells including an allowed tracking area list according to one embodiment of the present invention.

In other words in one embodiment of the invention, in order to find the wireless communication device the network may send out a paging message over the whole tracking area list that the wireless communication device is configured with. In other words assuming that the wireless communication device is configured with an allowed tracking area list consisting only of tracking area, the network then may send out a paging message in all cells belonging to that tracking area, see for instance FIG. 6.

That is, the invention may enable the network to quickly find the wireless communication device. Furthermore the on-duration in the wireless communication device may be short since the network may only need one single paging attempt to find the wireless communication device. The drawback may be that this requires a large number of paging messages to be transmitted.

In other words in one embodiment of the invention, paging the wireless communication device in all cells in the allowed tracking area list may enable fast paging and short on-duration, but may require many paging messages.

Therefore, the wireless communication device 10 according to the present invention is adapted to communicate with the network entity 110 for instance through a base station 120 via network 100, The wireless communication device 10 evaluates locally, i.e. in the wireless communication device, a condition that indicates an in-motion or stationary state of the wireless communication device.

Figure 2:
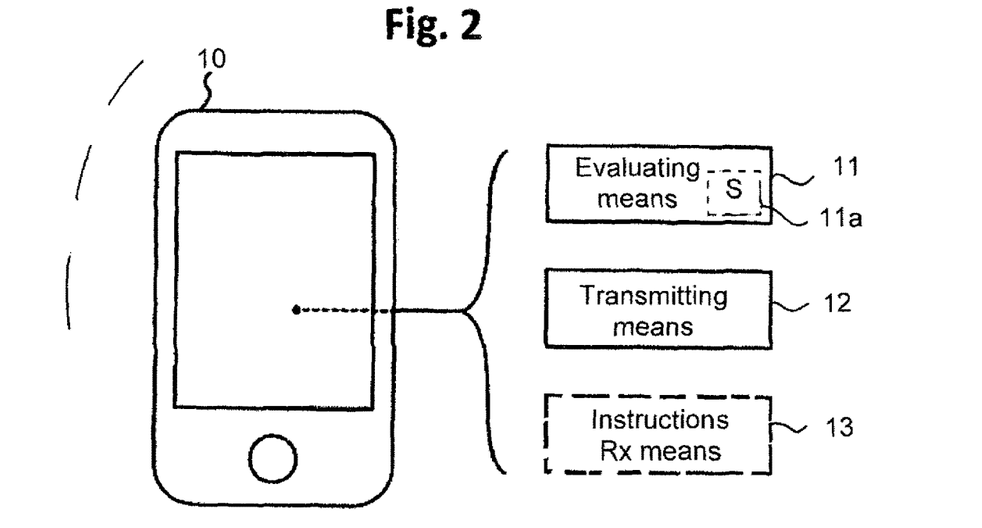
FIG. 2 shows an exemplary wireless communication device according to one embodiment of the present invention.

In one embodiment of the present invention the wireless communication device 10 comprises a sensor unit 11a. The sensor unit 11a is configured such that a signal is output indicating the motion state of the wireless communication device 10. In particular, the motion state may be a state where the wireless communication device is in-motion or stationary. In particular, the wireless communication device 10 may use the sensor unit to evaluate a condition indicating a motion state of the wireless communication device by comparing the value of the signal to a predetermined value. In one embodiment of the present invention the predetermined value may be a fixed value or may be a previous reading of the sensor unit 11a, that is a change of the measurement value taken by the sensor unit may be determined.

That is, the wireless communication device may be provided with one or more means to determine said condition, i.e. a sensor unit such as a motion sensor, a gyroscope, a temperature sensor, a light sensor, an air pressure sensor, an ignition sensor, a mechanical sensor, and a charging current sensor. The wireless communication device may use one or more of such a sensor unit 11a in order to determine a condition indicating a motion state of the wireless communication device. In other words the wireless communication device 10 is capable of determining whether it is in motion or stationary.

In other words in one embodiment of the invention wireless communication device sensors, e.g. gyroscope, ignition switch, pressure sensor, thermometer, etc., may be utilized to configure and control the paging and tracking behavior of the wireless communication device. For instance Smartphones may be equipped with gyroscopes already today, and in the future even more sensors may be integrated, both in devices for human-centric communication but also in machine-type communication devices. In one embodiment of the invention, the invention may be applied to connected vehicles, where the ignition switch could be utilized as indicator for paging re-configuration. It is possible to employ the present invention to sensors (such as measurement devices) and or actuators (such as valves etc.).

In one embodiment of the present invention the sensor unit 11a is a motion sensor which is capable of detecting a motion state of the wireless communication device. That is, the sensor unit 11a may use radio means such as a radio link to a base station 120 or any other radio signal provided such as a global positioning system, GPS, signal to determine the motion state of the wireless communication device.

In another embodiment of the present invention, the sensor unit 11a may use non-radio means in order to determine the in-motion or stationary state of the wireless communication device 10. For instance, the wireless communication device 10 may use means to determine acceleration such as a gyroscope. This way, in case the wireless communication device 10 is in the hand of a user while walking the gyroscope is capable of determining the acceleration associated with the motion. Subsequently a condition can be determined indicating an in-motion or stationary state of the wireless communication device 10.

In yet another embodiment of the present invention the sensor unit 11a may be a temperature sensor using means to detect a temperature or a change in temperature. This way the sensor unit 11a is capable of determining whether the wireless communication device 10 is placed in the hand of a user or on an object such as a table. That is the sensor unit may be capable of determining whether the wireless communication device 10 is picked up by a user or placed stationary for instance on a desk. This way, the sensor unit is capable of determining a condition indicating an in-motion or stationary state of the wireless communication device 10.

In another embodiment of the present invention the sensor unit is a light sensor using means detecting an overall light intensity and/or a light intensity change. That is, the sensor unit 11a is capable of determining whether the wireless communication device 10 is placed in a dark room for instance in a bedroom while the user may be asleep. This way the sensor unit 11a is capable of determining a motion state, in particular a stationary state of the wireless communication device 10.

In another embodiment of the present invention the sensor unit 11a may be an air pressure sensor using means to detect an overall pressure or a pressure change in the environment surrounding the wireless communication device 10. This way the sensor unit 11a is capable of determining a condition indicating a motion state of the wireless communication device.

Further yet according to another embodiment of the present invention the sensor unit 11a may be an ignition sensor using means to detect the ignition state of a vehicle such as a car (not shown). That is, for instance if the wireless communication device is mounted in a vehicle or is connected to a vehicle the wireless communication device 10 may determine the on/off ignition state of the vehicle in order to determine whether the vehicle is in an on state and potentially moving. If the ignition is in an off state, the sensor unit 11a is capable of determining a condition, i.e. the off state of the ignition, indicating a stationary state of the wireless communication device.

In another embodiment of the present invention the sensor unit 11a may be a mechanical sensor using mechanical means in order to determine said condition. That is for instance the mechanical sensor may use sensors to detect that the wireless communication device is placed in a docking station. That is mechanical pressure sensors in or around the wireless communication device may be used to determine the position in the docking station, i.e. a condition, indicating a stationary state of the wireless communication device.

In yet another embodiment of the present invention the sensor unit 11a may be a charging current sensor using means to detect a charging current used to recharge a battery (not shown) of the wireless communication device 10. This way the sensor unit 11a is capable of determining a charging state of the wireless communication device 10, i.e. a condition indicating a stationary state of the wireless communication device 10.

In another embodiment of the present invention, the sensor unit 11a may output a signal indicating the motion state of the wireless communication device 10 or indicating a likelihood of the motion state of the wireless communication device 10. That is, the wireless communication device 10 may be adapted to use a sensor unit 11a outputting for instance a specific value for an in-motion state and another value for a stationary state, or maybe adapted to use a sensor unit 11a giving out a continuous or discrete signal indicating whether it is more likely or less likely for the wireless communication device 10 to be either in an in-motion or a stationary state.

According to the present invention the wireless communication device 10 is further adapted to transmit information for adapting a paging and/or tracking mode in the network, wherein the information indicates the in-motion or stationary state of the wireless communication device 10, towards the communication network. That is the wireless communication device 10 is provided with transmitting means 12 to transmit information indicating the motion state of the wireless communication device to the network. For instance the wireless communication device 10 may use transmitting means 12 for instance being part of communication means 10 of the wireless communication device 10 to transmit a signal indicating the information about the motion state of the wireless communication device 10 to the base station 120 and subsequently via the network 100 to the network entity 110.

In one embodiment of the present invention the wireless communication device may be adapted to receiving instructions to use a paging and/or tracking mode determined by network entity based on the information indicating the in-motion or the stationary state.

Figure 3:
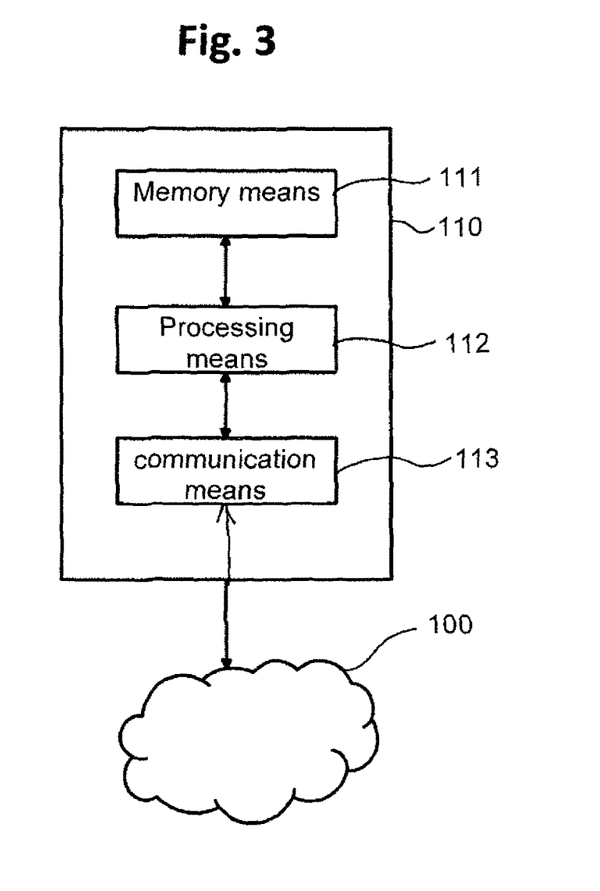
FIG. 3 shows a general entity embodiment according to the present invention for performing paging and tracking of a wireless communication device.

That is, the network entity 110 may use communication means to receive a signal indicating the motion state of the communication device via the network 100. Subsequently the network entity 110 may use processing means 112 to determine a paging and/or tracking mode for the wireless communication device based on the information indicating the motion state, i.e. an in-motion or stationary state, of the wireless communication device 10. The network entity 110 may have different paging and/or tracking modes for the wireless communication saved on a memory or memory means 111 which may be used during the determination of a paging and/or tracking mode. The communication means 113 may comprise further transmission means in order to transmit instructions to use a paging and/or tracking mode to the wireless communication device via the network 100 and the base station 120.

The wireless communication device 10 may comprise further instructions receiving means 13 for receiving instructions transmitted by the network entity 110 to use a paging and/or tracking mode. The wireless communication device 10 may further comprise processing means 10 configured to adapt a paging and/or tracking mode for signal reception on the basis of the received instructions from the network entity. The communication device 10 may further comprise memory means 10c adapted to store the paging and/or tracking mode received from the network entity 110.

In one embodiment of the present invention the wireless communication device may be instructed to adapt a regular paging and/or tracking mode for signal reception when the wireless communication device is in motion. That is, when the wireless communication device 10 evaluated or determined a condition indicating that the wireless communication device is in motion, information indicating an in-motion state is transmitted from the wireless communication device through the base station 120 via the network 100 to the network entity 110. The network entity 110 then determines that a regular paging and/or tracking mode in the network is to be used for the wireless communication device 10 based on the information received. Subsequently the network entity 110 informs the wireless communication device 10 via base station 120 and through the network 100 that the regular paging and/or tracking mode is to be used.

In another embodiment of the present invention, the wireless communication device is further configured to adapt a limited paging and/or tracking mode based on the received instructions determined based on information indicating the stationary state.

The regular paging and/or tracking mode uses more resources of the wireless communication device and/or more resources of the network than the limited paging and/or tracking mode.

That is, the wireless communication device transmits a signal indicating the stationary state of the wireless communication device for instance determined using a sensor unit via base station 120 through network 100 to the network entity 110. The network entity 110 determines that a limited paging and/or tracking mode is to be used by the wireless communication device 10 stationary in the tracking area 20. The network entity 110 subsequently transmits a signal to the wireless communication device 10 through the network 100 via base station 120 indicating the use of the limited paging and/or tracking mode.

In one embodiment of the present invention, the limited paging and/or tracking mode is using a longer paging cycle as the regular paging and/or tracking mode.

In yet another embodiment of the present invention the limited paging and/or tracking mode uses a precision paging only in an area from which the wireless communication device was communicating with the network in a previous paging and/or tracking cycle. That is, the network sends a paging message only from, for instance, the base station associated with a tracking area about which the network knows the wireless communication device 10 was located in during the last communication with the network. In other words, as the communication device 10 indicated to the network 100 or network entity 110 that it is stationary, i.e. not moving, the network 100 may correctly assume that the communication device 10 will stay in the tracking area 20 the network was communicating with the wireless communication device 10 in the last paging cycle. In other words yet, the wireless communication device 10 indicated to the network 100 that it does not change its position and subsequently that a paging and tracking message may be sent less frequently compared to a state where the wireless communication device 10 is in motion and/or only in the specified tracking area 20.

In another embodiment of the present invention the wireless communication device is adapted to reduce the on-duration for a paging and/or tracking mode, when instructed to use the limited paging and/or tracking mode.

In yet another embodiment of the present invention the wireless communication device may be adapted to increase a paging cycle for the paging and/or tracking mode, when instructed to use a limited paging and/or tracking mode.

In another embodiment of the present invention the wireless communication device may be adapted to transmitting the information for adapting a paging and/or tracking mode in an idle or connected state.

This way, a system comprising the wireless communication device 10 and the network entity 110 may be capable of performing a method for paging and/or tracking a wireless communication device 10 in a mobile or wireless communication network 100 wherein the method uses less resources of the wireless communication device 10 as well as less resources of the network 100, i.e. consuming less energy and providing a longer battery life for the wireless communication device 10 and enabling a more efficient network paging method.

Generally, the mentioned processing means 112 of the network entity 110 may be a processing unit, a processor, a processing unit collection, CPU, a share of a data/processing center and so on. The processing means 112 are capable of performing determining a paging and/or tracking mode for the wireless communication device based on the information indicating the in-motion or stationary state of the wireless communication device.

The memory means 111 of the network entity 110 may specifically store code instructing the processing means 112 to implement a method embodiment of the present invention. Particularly the memory means 111 may store code instructing the processing means 112 during operation to determine a paging and/or tracking mode for the wireless communication device based on the information indicating the in-motion or stationary state of the wireless communication device.

For instance in one embodiment of the present invention the communication means 113 of the network entity 110 may connect to the network 100. Through the communication means 113 the network entity 110 may receive a signal indicating the motion state of the wireless communication device. However, there may be more than one communication means to separately receive the signal indicating the motion state of the wireless communication device and to transmit instructions to use a paging and/or tracking mode.

Further, in one embodiment of the present invention the communication means 113 may be connected to several entities apart from the network 100 in order to receive the signal indicating the motion state of the wireless communication device 10.

Figure 4:
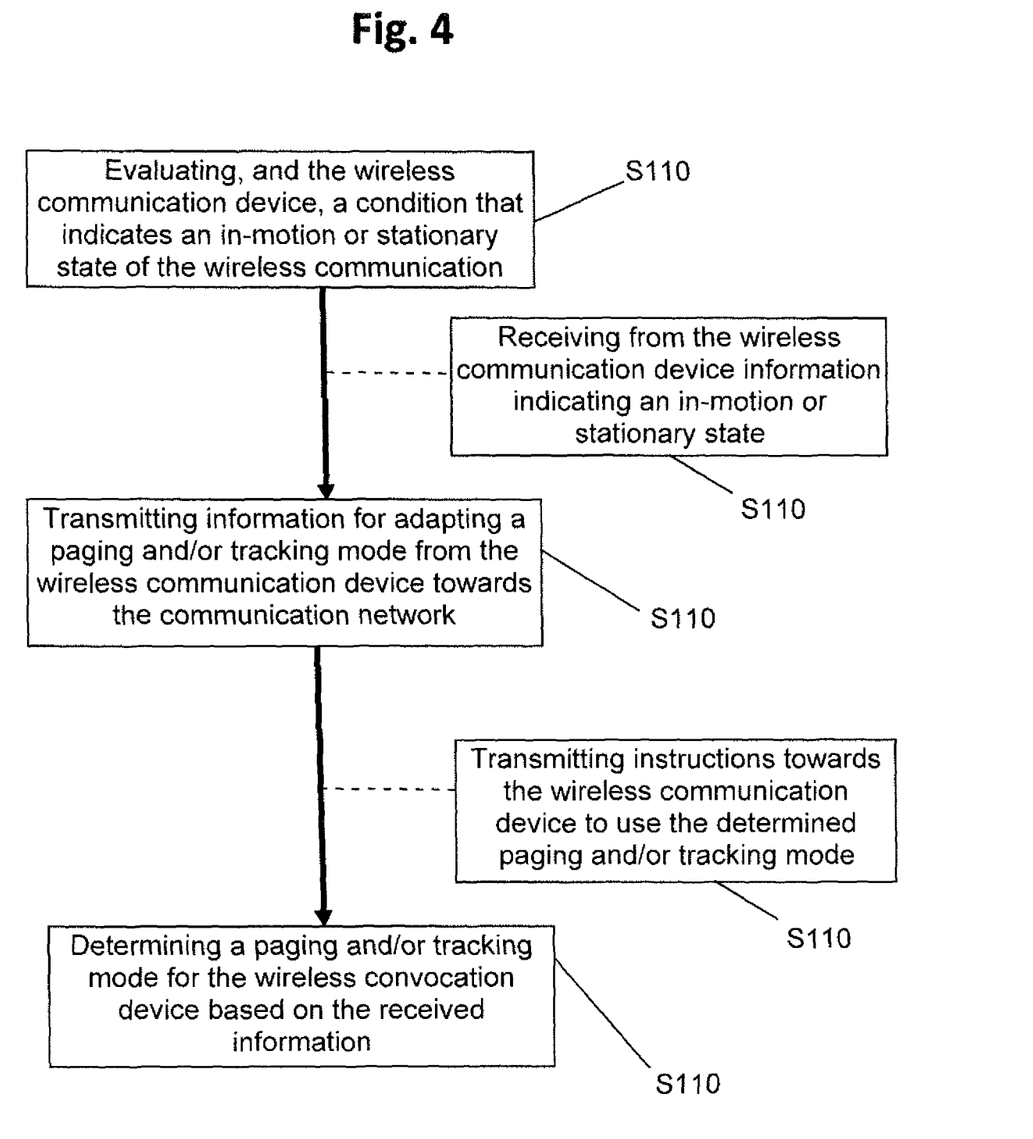
FIG. 4 shows a schematic overview of a method performing paging and tracking of a communication device according to one embodiment of the present invention.

FIG. 4 shows a flowchart of a method for paging and/or tracking a wireless communication device of a mobile or wireless communication network comprising the steps S110 to S150.

In a step S110 a condition that indicates an in-motion or stationary state of the wireless communication device 10 may be evaluated locally, i.e. in the wireless communication device 10.

The method may further comprise a step S120 transmitting information for adapting a paging and/or tracking mode from the wireless communication device 10 towards the communication network 100, wherein the information indicates the in-motion or stationary state of the wireless communication device 10.

The method may further comprise a step S140 determining a paging and/or tracking mode for the wireless communication device 10 based on the received information.

In another embodiment of the invention, the method may further comprise a step S120 receiving from the wireless communication device information indicating an in-motion or stationary state.

In yet another embodiment of the present invention the method may further comprise a step S150 transmitting instructions towards the wireless communication device to use the determined paging and/or tracking mode.

In other words in one embodiment of the invention only the case may be considered when the tracking area determination and the paging reception occurs in the same on-duration interval, but it should be obvious to one skilled in the art that this may be further divided into sub-tasks, e.g. perform cell search, perform cell selection, acquire system synchronization, receive system information, etc., that are needed in order to perform the tracking area determination and the paging reception. These sub-tasks may also be performed at different times and with different periodicity. But for sake of simplicity of the description only examples may elaborated further where these tasks are performed during one on-duration interval.

In other words in one embodiment of the invention, to enable efficient network paging the "DTX" duration may be short so the wireless communication device can be paged quickly whenever needed. Furthermore the "on-duration" may be long to enable the network to page the wireless communication device multiple times. This may for example enable the UE to initially page the UE only in the cell where it was previously active and not send out the paging messages over the entire tracking area list.

Figure 8:
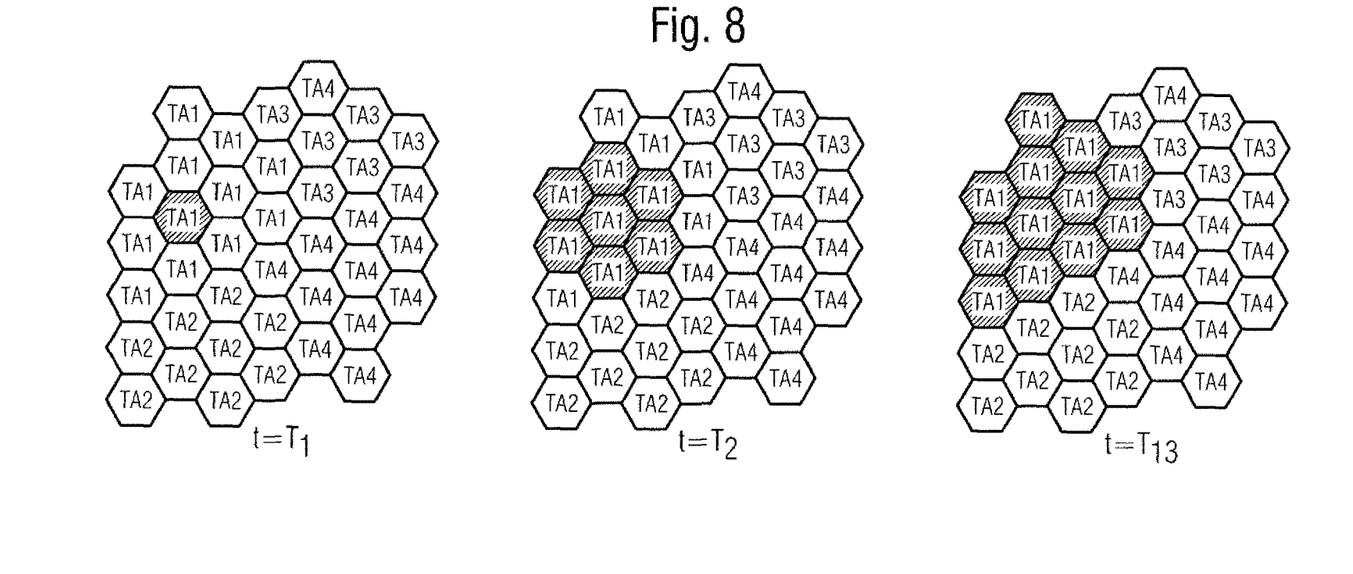
FIG. 8 shows selecting a tracking area at different steps of a paging procedure according to one embodiment of the present invention.

In other words in one embodiment, the number of paging messages may be significantly reduced, at least on average, by initially paging the wireless communication device in a small number of cells in the tracking area list, see FIG. 8. The drawbacks with this may be that it takes longer time and may require several attempts to be guaranteed to find the wireless communication device. This may be compensated for by making the UE on-duration longer and/or by making the paging cycle shorter which may have the negative effect of increasing the UE power consumption.

In other words in one embodiment of the invention by selectively paging the wireless communication device, initially only in one or a few cells, the average number of paging messages may be significantly reduced. This however may require more attempts and hence the wireless communication device on-duration may need to be extended or the paging cycle may need to be shortened.

Figure 7:
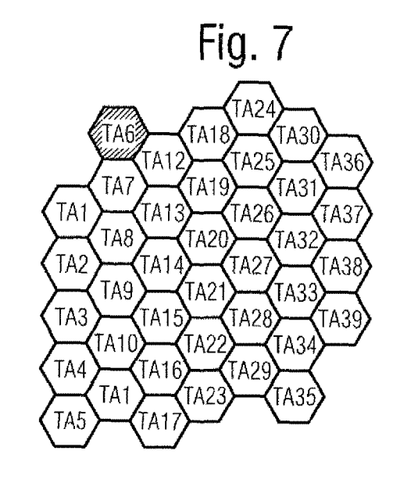
FIG. 7 shows another configuration of cells including a reduced allowed tracking area list.

In other words in one embodiment of the invention, in order to reduce the number of paging messages that the network may have to send and at the same time may ensure that the wireless communication device may be found quickly in one embodiment of the invention, as shown in FIG. 7, the size of the tracking areas may be decreased. The drawback with this solution may be that it may require more location area update messages to be transmitted from the wireless communication devices which may drain the battery of the wireless communication device and may cause interference and may consume capacity in the network. Alternatively the wireless communication device may be configured with very long allowed tracking area lists which are difficult to manage in practice.

In one embodiment of the invention, reducing the tracking area sizes may enable the network to quickly find the wireless communication device at the expense of either very many location area update messages or very complex management of tracking area lists.

In other words in one embodiment of the invention, using the maximum paging cycle may force the network to find the wireless communication device in only one attempt. This may imply paging the wireless communication device in all cells in the tracking area list already in the first attempt. This may, however be inefficient since it may require more paging messages to be transmitted from the network.

In one embodiment of the invention, alternatively the tracking area list may need to be small which may lead to an increased number of location area updates when the wireless communication device is in idle mode mobility, i.e. decreases battery life, or configuring each wireless communication device with a long list of TAs in the allowed tracking area list, i.e. being complex.

In one embodiment of the invention paging may be a system function that may need to be "always on", and it may cause significant network energy consumption as it means the network quite frequently need to transmit paging messages even though no user data transmissions take place. From a network energy performance perspective, it may be desirable to make it more efficient if possible.

In other words in one embodiment of the invention, in some cases it may be reliably predicted that the wireless communication device will be stationary for a significant time duration, that may be for instance when a smartphone or the alike is located in a charger (not shown); when sensors of the wireless communication device may detect that it is not moving; when it is night time; when a connected car is parked and the engine is off or the wheels are not rotating, etc.

In one embodiment the wireless communication device may signal to the network "I'm stationary" in order to enable the use of a "lean paging and tracking mode"

In one embodiment the network may then use a "precision paging" in only the cell the wireless communication device was last connected to In one embodiment the wireless communication device may reduce the on-duration and/or increase the paging cycle In other words in one embodiment in case user activity and/or wireless communication device movement may be detected the wireless communication device may signal the network "I am active" in order to enable a "normal paging and tracking mode".

In one embodiment one advantage for the wireless communication device may be that the proposed invention may increase the DRX duration and/or decrease the non-active "on-duration". This may extend the battery life of the wireless communication device.

In one embodiment of the present invention, for the network the use of the proposed invention may enable the benefits of reduced overhead from non-data related transmission; lower interference and hence higher performance as well as longer time to sleep and hence lower network energy consumption.

Figure 9:
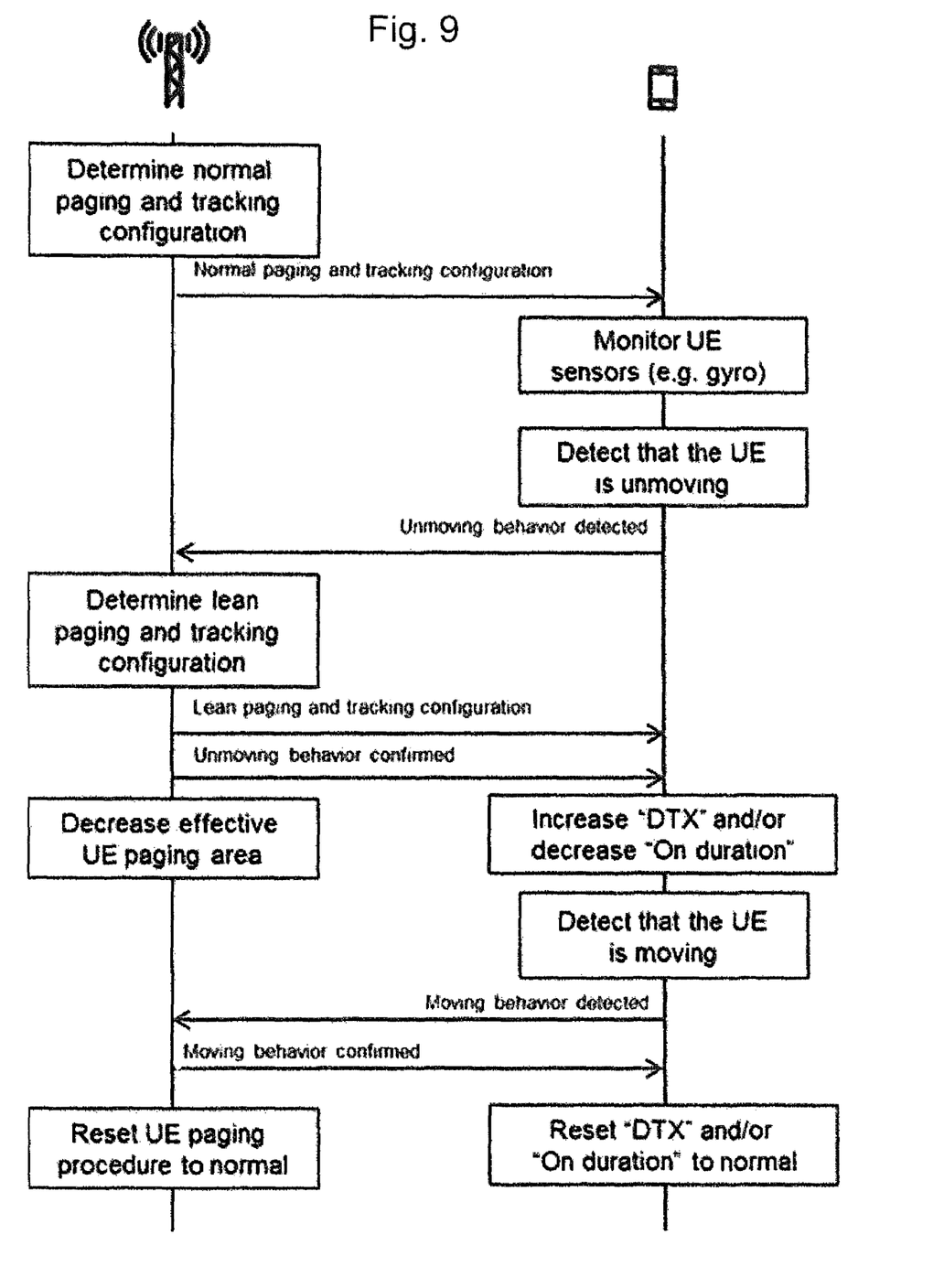
FIG. 9 shows an exemplary embodiment of the present invention.

In other words one embodiment depicting the usage of the invention is shown in FIG. 9. The wireless communication device may be configured with "a normal paging and tracking configuration". In one embodiment of the invention, by monitoring sensors the wireless communication device may detect that is in an "unmoving" state in which a more efficient paging and tracking behaviour could be used.

In other words in one embodiment the wireless communication device may signal to the network that "unmoving behaviour" is detected. In response the network may send a confirmation message back to the wireless communication device. Prior to this the network may determine and may communicate "lean paging and tracking parameters" and may communicate these parameters to the wireless communication device. The "lean" parameter set may alternatively be implicitly derived based on a standardized rule.

In other words, the "lean paging and tracking" configuration may be that it has a longer paging cycle, a shorter on-duration, and/or a longer DTX duration compared to the "normal paging and tracking" configuration. In addition the network may use a smaller effective paging area, e.g. it may page the UE only in one single cell instead of in every cell in the entire allowed tracking area list.

In one embodiment of the invention once a sensor may detect that the wireless communication device is no longer in an unmoving state or after a timer runs out, it signals the network again and after a handshake the normal paging and tracking configuration may be used again.

In one embodiment of the invention it may be possible to enable longer DTX, longer paging cycle, and/or shorter on-duration in the UE and thereby increasing UE battery life by means of selecting based on UE sensors between a normal and a lean paging and tracking configuration.

In another embodiment of the invention it may be possible to rely on sensors of the wireless communication device and reporting in order to enable high precision selection of cells that need to transmit paging messages in the network.

Although detailed embodiments have been described, these only serve to provide a better understanding of the invention defined by the independent claims and are not to be seen as limiting.

The invention claimed is:

1. A wireless communication device adapted to communicate with a network entity of a wireless communication network, the wireless communication device comprising:
   processing circuitry;
   memory containing instructions executable by the processing circuitry whereby the wireless communication device is operative to:
   evaluate a condition that indicates an in-motion or stationary state of the wireless communication device;
   transmit information for adapting a paging and/or tracking mode in the network, the information indicating the in-motion or stationary state of the wireless communication device towards the communication network; and
   adapt a limited paging and/or tracking mode based on a received mode instructions determined based on the information indicating the stationary state,
   wherein the limited paging and/or tracking mode comprises a longer paging cycle, and
   wherein a regular paging and/or tracking mode uses more resources than the limited paging and/or tracking mode.

2. The wireless communication device of claim 1:
   further comprising a sensor unit configured to output a signal that indicates the in-motion or stationary state of the wireless communication device; and
   wherein the instructions in memory are such that the wireless communication device is operative to evaluate the conditions by comparing a value of the signal to a predetermined value.

3. The wireless communication device of claim 2, wherein the sensor unit is: a motion sensor, a gyroscope, a temperature sensor, a light sensor, an air pressure sensor, an ignition sensor, a mechanical sensor, and/or a charging current sensor.

4. The wireless communication device of claim 1, wherein the instructions in memory are such that the wireless communication device is operative to receive mode instructions to use a paging and/or tracking mode determined by a network entity based on the information indicating the in-motion or stationary state.

5. The wireless communication device of claim 4, wherein the instructions in memory are such that the wireless communication device is operative to adapt a paging and/or tracking mode for signal reception based on the received mode instructions.

6. The wireless communication device of claim 1, wherein the instructions in memory are such that the wireless communication device is operative to adapt a regular paging and/or tracking mode for signal reception based on the received mode instructions determined based on the information indicating the in-motion state.

7. The wireless communication device of claim 1, wherein the limited paging and/or tracking mode uses a precision paging only in an area from which the wireless communication device was communicating with the network in a previous paging and/or tracking cycle.

8. The wireless communication device of claim 1, wherein the instructions in memory are such that the wireless communication device is operative to reduce an on-duration for the paging and/or tracking mode, when instructed to use the limited paging and/or tracking mode.

9. The wireless communication device of claim 1, wherein the instructions in memory are such that the wireless communication device is operative to increase a paging cycle for the paging and/or tracking mode, when instructed to use the limited paging and/or tracking mode.

10. The wireless communication device of claim 1, wherein the instructions in memory are such that the wireless communication device is operative to transmit the information for adapting a paging and/or tracking mode in an idle or connected state.

11. A network entity coupled to a wireless communication network adapted to receive data from a wireless communication device, the network entity comprising:
  processing circuitry;
  memory containing instructions executable by the processing circuitry whereby the network entity is operative to:
    receive, from the wireless communication device, information for adapting a paging and/or tracking mode in the network indicating an in-motion or stationary state of the wireless communication device; and
    determine a paging and/or tracking mode for the wireless communication device based on the information indicating the in-motion or stationary state of the wireless communication device,
    wherein the wireless communication device adapt a limited paging and/or tracking mode based on a received mode instructions determined based on the information indicating the stationary state,
      wherein the limited paging and/or tracking mode comprises a longer paging cycle, and
      wherein a regular paging and/or tracking mode uses more resources than the limited paging and/or tracking mode.

12. A wireless communication network system, comprising
  a wireless communication device adapted to communicate with a network entity of the wireless communication network; the wireless communication device comprising processing circuitry and memory containing instructions executable by the processing circuitry whereby the wireless communication device is operative to:
    evaluate a condition that indicates an in-motion or stationary state of the wireless communication device; and
    transmit information for adapting a paging and/or tracking mode in the network, the information indicating the in-motion or stationary state of the wireless communication device towards the communication network,
    adapt a limited paging and/or tracking mode based on a received mode instructions determined by the network entity,
      wherein the limited paging and/or tracking mode comprises a longer paging cycle, and
      wherein a regular paging and/or tracking mode uses more resources than the limited paging and/or tracking mode; and
  the network entity; the network entity adapted to receive data from the wireless communication device; the network entity comprising processing circuitry and memory containing instructions executable by the processing circuitry whereby the network entity is operative to:
    receive, from the wireless communication device, the information for adapting a paging and/or tracking mode in the network indicating an in-motion or stationary state of the wireless communication device; and
    determine a paging and/or tracking mode for the wireless communication device based on the information indicating the in-motion or stationary state of the wireless communication device.

13. A method for paging and/or tracking a wireless communication device of a wireless communication network, the method comprising:
  evaluating, in the wireless communication device, a condition that indicates an in-motion or stationary state of the wireless communication device;
  transmitting information for adapting a paging and/or tracking mode from the wireless communication device towards the communication network, the information indicating the in-motion or stationary state of the wireless communication device,
  adapt a limited paging and/or tracking mode based on a received mode instructions determined,
    wherein the limited paging and/or tracking mode comprises a longer paging cycle; and
    wherein a regular paging and/or tracking mode uses more resources than the limited paging and/or tracking mode; and
  determining a paging and/or tracking mode for the wireless communication device based on the received information.

14. The method of claim 13, further comprising receiving, from the wireless communication device, the information indicating an in-motion or stationary state.

15. The method of claim 13, further comprising transmitting instructions towards the wireless communication device to use the determined paging and/or tracking mode.

* * * * *